June 9, 1936. W. L. MORRISON 2,043,672
VEHICLE WINDSHIELD
Filed June 8, 1934 6 Sheets-Sheet 1

Inventor:
Willard L. Morrison,
By Morsell, Lieber & Morsell
Attys

June 9, 1936. W. L. MORRISON 2,043,672
VEHICLE WINDSHIELD
Filed June 8, 1934 6 Sheets-Sheet 6

Inventor
Willard L. Morrison
By Morsell, Lieber & Morsell Attys.

Patented June 9, 1936

2,043,672

UNITED STATES PATENT OFFICE 2,043,672

VEHICLE WINDSHIELD

Willard L. Morrison, Lake Forest, Ill.

Application June 8, 1934, Serial No. 729,650

9 Claims. (Cl. 296—84)

The present invention relates generally to improvements in windshield structures for vehicles, and relates more specifically to an improved appliance for insuring maintenance of clear vision and for eliminating objectionable glare thru the ordinary windshield, and for minimizing objectionable drafts over the top of the windshield when the vehicle top is removed.

Generally defined, an object of the invention is to provide an improved auxiliary shield associable with the main windshield of a vehicle to maintain clear vision thru the main shield, and to also prevent undesirable draft around the main shield under certain conditions of use.

During the cold weather seasons of the year, it is desirable to provide some means for preventing deposition of frost and other vision-obstructing formations on the front windshield of a vehicle; and such view-obstructing deposits may, to a great extent, be eliminated by merely providing a confined air space in contact with the main windshield and in the zone of vision of the driver. Numerous types of such frost eliminators or shields have heretofore been provided, and during warm weather seasons, it is customary to remove these appliances from the vehicle until they are again needed. In the case of convertible enclosed and open cars, it is also frequently desirable, during warm weather seasons, to lower the top enclosure; and when the top enclosure is thus removed, the down draft over the top of the main windshield and in the vicinity of the driver's seat, is sometimes too severe for comfort. The glare of approaching head lights is normally controlled by separate appliances attached either directly to the main windshield or to a portion of the top vehicle enclosure, but when the latter is lowered or removed, the normal support for the glare shield is no longer available.

It is therefore a more specific object of the present invention to provide an improved convertible frost shield, down draft regulator, and anti-glare shield associable directly with the main windshield of a vehicle, the appliance being readily adjustable to effectively perform either of these several functions.

Another specific object of the invention is to provide an interchangeable, clear vision device and draft regulator which may be readily applied to an automobile or similar vehicle without impairing the normal appearance of the vehicle.

A further specific object of the invention is to provide an improved convertible glare shield and down draft eliminator associable with the main windshield or windshields of an open vehicle.

An additional specific object of the invention is to provide an improved storm shield cooperable with an ordinary windshield thru improved seals which are effectively protected against deterioration when the auxiliary shield is not in use.

Still another specific object of the invention is to provide a combined clear vision device and draft deflector which may be converted from one use to the other and vice versa, by an occupant of the vehicle, and without leaving the seat adjacent to the windshield with which the device is associated.

Another specific object of the invention is to provide a readily removable storm shield for windshields and means for insuring a tight seal between the two shields.

A further specific object of the invention is to provide an improved protective device for a mobile vehicle whereby the occupants of the vehicle may conveniently and effectively control the draft in the vicinity of the seats, regardless of whether the vehicle top is raised or lowered.

An additional specific object of the invention is to provide a secondary roof structure for automobiles of the convertible type which will enhance the comfort and usefulness of such vehicles.

Still another specific object of the invention is to provide a durable and attractive clear vision and draft regulating appliance for mobile vehicles which can be readily applied to standard cars and conveniently manipulated.

These and other objects will be apparent from the following description.

A clear conception of several embodiments of the present invention, and of the construction and operation of several types of windshield appliances built in accordance therewith, may be had by referring to the drawings accompanying and forming part of this specification, in which like reference characters designate similar parts in the various views.

Fig. 32 is a perspective view of a fragment of the auxiliary windshield of the modified structure, showing the upper translucent portion thereof and the flexible sealing lip at the lower end thereof;

Fig. 38 is a fragmentary, sectional view of a further modified mounting for an auxiliary windshield, which is cooperable with the main windshield of a standard automobile;

Fig. 39 is a fragmentary plan view of Fig. 38, showing the auxiliary windshield positioned beneath the top enclosure of the vehicle;

Fig. 40 is a view similar to that of Fig. 38, with the vehicle top enclosure removed and the auxiliary windshield positioned as an air deflector, and showing the secondary windshield in another position of adjustment in dot-and-dash lines;

Fig. 41 is a view of the structure shown in Fig.

40, but with the thumb screw released and the shield supporting bracket moved to an extreme position preparatory to swinging the same in the direction of the arrow;

Fig. 42 is a fragmentary plan view of the structure shown in full lines in Fig. 40;

While the invention has been shown and described herein as being specifically applied to the front windshield of an automobile, it is not intended to restrict the scope by such specific disclosure since some of the novel features of auxiliary deflector and protective shield constructions are obviously more generally applicable to other than the front windshields of automobiles.

Figure 1:
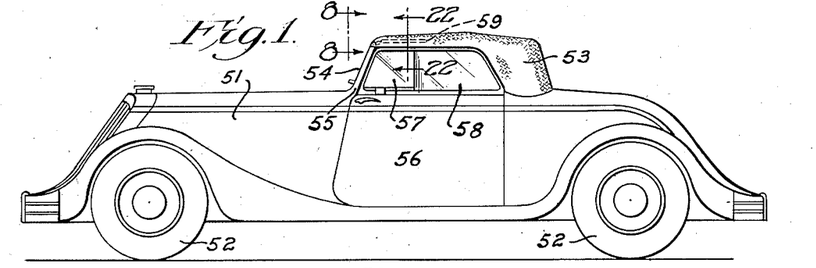
Fig. 1 is a side elevation of an automobile of the convertible type having a secondary windshield associated therewith and disposed directly beneath the elevated top enclosure of the machine.

Referring specifically to Fig. 1, the standard convertible roadster type of automobile shown therein comprises in general a body 51 supported upon the usual chassis carried by wheels 52, and having a collapsible or otherwise removable top enclosure 53 disposed over the driver's seat and cooperable with the ordinary front or main windshield 54 to protect the occupants of the seat. The main windshield 54 may be either permanently fixed within or pivotally suspended from a rigid frame comprising side posts 55 formed integral with the body 51, and the opposite sides of the machine are provided with doors 56 which may be hingedly supported either at the front or rear thereof. Side wings 57, which may be pivotally attached either to the posts 55 or to the upper ends of the doors 56, are adapted to cooperate with the main windshield 54 to control the side draft in the vicinity of the seat; and the doors 56 may also be provided with upwardly slidable windows 58, which are cooperable with the top enclosure 53 to regulate the ventilation within the car. All of these various elements are of relatively standard and well-known construction in the trade, and the several elements described may assume a variety of styles or forms.

Figures 2, 3, 4, 5:
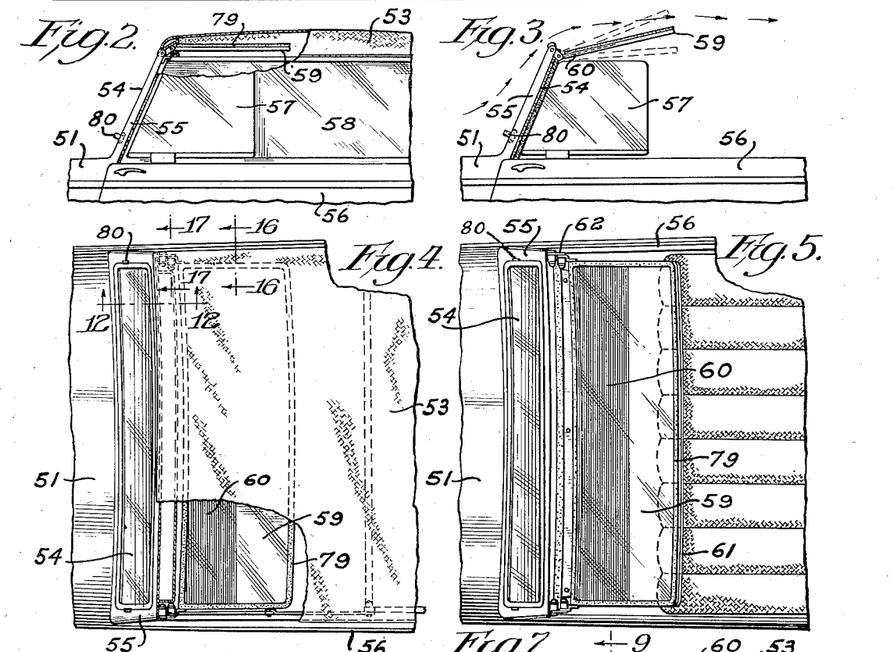
Fig. 2 is an enlarged fragmentary, sectional view of the upper front portion of the machine, having portions thereof broken away and showing the secondary windshield in inactive position.
Fig. 3 is a view similar to that of Fig. 2, with the top enclosure of the machine removed and the secondary windshield in normal use and showing the same in several positions of adjustment.
Fig. 4 is a fragmentary plan view of the structure shown in Fig. 2, showing the position of the secondary windshield beneath the top enclosure of the car as when not in use.
Fig. 5 is a view similar to that of Fig. 4, but with the top enclosure of the car removed and the secondary windshield in operative position.
Figure 6:
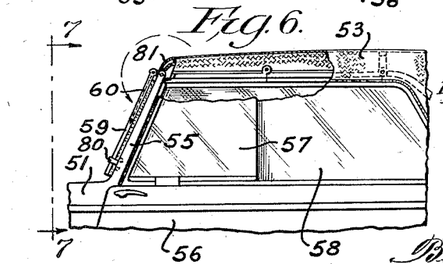
Fig. 6 is a view similar to that of Fig. 2, but with the secondary shield swung forwardly about its pivotal axis and associated with the front of the main windshield to function as a storm shield.
Figure 7:
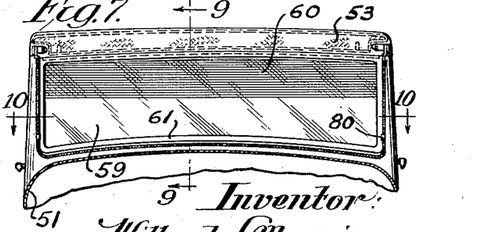
Fig. 7 is a front view taken on the line 7—7 of Fig. 6, showing the secondary windshield in operative coaction with the front of the main windshield of the vehicle.

In the embodiment of the invention shown in Figs. 2–25 inclusive, an auxiliary deflector or storm shield 59 is pivotally supported near one of its longitudinal edges, at the upper end of the main windshield frame and of the posts 55, in such manner that the shield 59 may be utilized interchangeably either as a sub-top when in inactive position, as illustrated in Figs. 2 and 4, or as a down draft regulator for the driver's seat, as illustrated in Figs. 3 and 5, or as a clear vision appliance and protector for the main windshield 54, as illustrated in Figs. 6, 7, 9, and 10. The portion 60 of the auxiliary shield 59, which is nearest the pivotal mounting thereof, may be appropriately colored for glare eliminating purposes; and when this shield 59 is utilized as in Figs. 3 and 5, it is readily adjustable to assume various angular positions and cooperates with the side wings 57, which may also be adjustable independently of the shield 59, to effectively regulate the draft at the driver's seat. The storm shield 59 is preferably of the same general size as that of the main windshield 54 and is embraced by a marginal rim 61 of practically the same shape as that of the main windshield, and both of these shields may be formed either of ordinary or of shatter-proof glass.

Figures 18, 19, 20, 21, 22, 23:
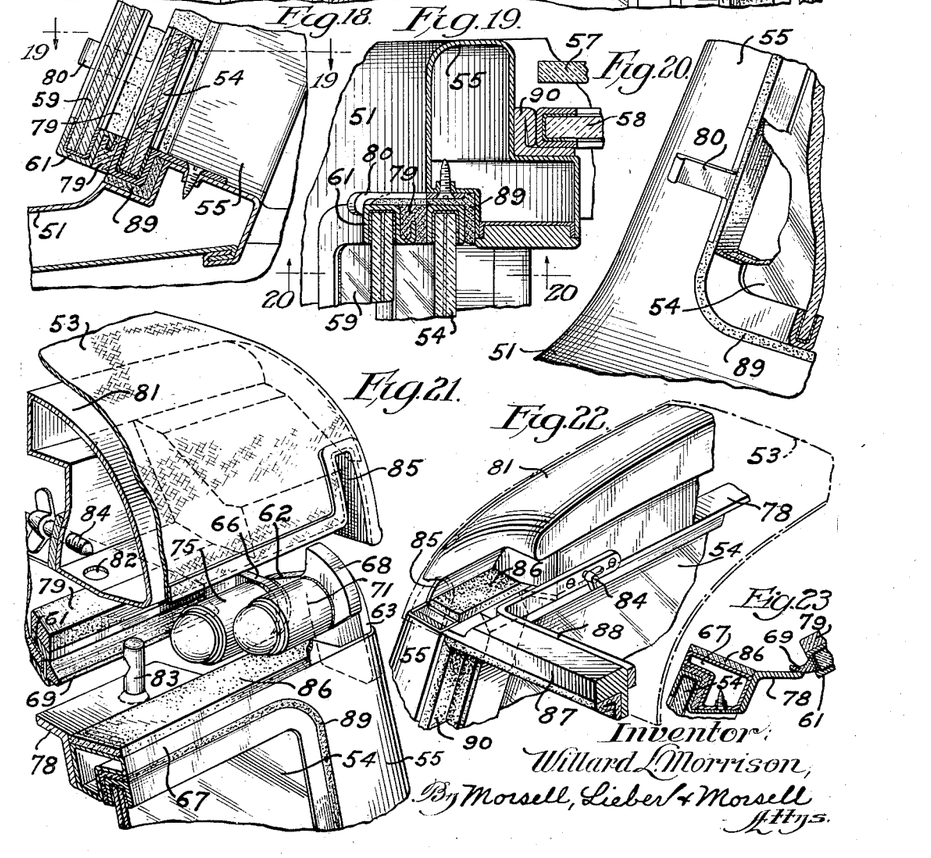
Fig. 18 is an enlarged, fragmentary section thru the lower portion of the auxiliary and main windshields assembled as in Fig. 9.
Fig. 19 is a section thru a fragment of the assembled main and auxiliary windshields, taken along the line 19—19 of Fig. 18.
Fig. 20 is a perspective view of one corner of the assembled auxiliary and main windshields, taken approximately along the line 20—20 of Fig. 19.
Fig. 21 is a perspective view of an upper corner of the assembled deflector shield structure, showing the top enclosure about to be fastened to the upper end of the main windshield frame and also showing the auxiliary windshield positioned beneath the top, the view being taken approximately along the line 21—21 of Fig. 8.
Fig. 22 is a perspective view of the main windshield structure, showing the auxiliary windshield and the mounting therefor removed in order to illustrate the space normally occupied by the secondary windshield mounting, the view being taken approximately along the line 22—22 of Fig. 1.
Fig. 23 is an enlarged, fragmentary section, showing the sealing means between the auxiliary windshield and the main windshield supporting frame, taken along the line 23—23 of Fig. 15.

By referring more particularly to Figs. 8–25 inclusive, it will be observed that the pivotal mounting for the auxiliary shield 59 is composed of a pair of parallel side links 62, corresponding ends of which are swingably attached to rigid lugs 63, projecting from the upper portions of the posts 55, by means of pivots 64, and the opposite ends of which are likewise attached to the auxiliary shield by pivots 65 coacting with side brackets 66 secured to the rim 61. The side posts 55 of the main windshield supporting frame are rigidly interconnected to the top by a transverse brace 67, and as specifically shown in the drawings, the main windshield 54 is permanently secured within its supporting frame structure. The links 62 are formed with enlarged portions 68 at their permanently pivoted ends, and the portion of the auxiliary shield 59 which is closest to the pivots 65, is provided with a sealing lip 69 extending thru-out the length of the auxiliary shield. The pivots 64 are embraced by compression springs 70 confined within housings 71, and a suitable friction pad 72 is interposed between each of the lugs 63 and the adjacent link 62. The inner end of each pivot 64 is threaded for the reception of a clamping nut 73, and by adjusting this nut relative to its pivot, the degree of friction for retaining the corresponding link 62 in adjusted position may be conveniently varied. Each of the pivots 65 is likewise embraced by a helical compression spring 74 confined within a housing 75, and a friction pad 76 is interposed between each bracket 66 and the adjacent link 62. The pivots 65 are also threaded to receive adjusting nuts 77, whereby the retaining friction between the auxiliary shield 59 and the links 62 may likewise be conveniently varied. With the adjusting nuts 73, 77 properly positioned, the auxiliary shield 59 may be conveniently swung to any desired position and will thereafter be automatically retained in the desired position of adjustment due to the friction created by the compression springs 70, 74. The sealing lip 69 is cooperable with a metallic sealing flange 78 attached directly to the cross-brace 67, as shown in Fig. 23, when the auxiliary shield is being utilized as a draft regulator. The rim 61 of the auxiliary shield 59 is provided with a continuous sealing pad 79 which is cooperable with the outer surface of the frame of the windshield 54, as clearly shown in Figs. 11 and 18, when the shield 59 is being utilized as a storm shield; and side posts 55 are provided with holding clamps 80 which are cooperable with the sides of the rim 61 to hold the auxiliary shield 59 in position in front of the windshield 54.

Figures 8, 9, 10, 11, 11A, 12, 13, 14, 15:
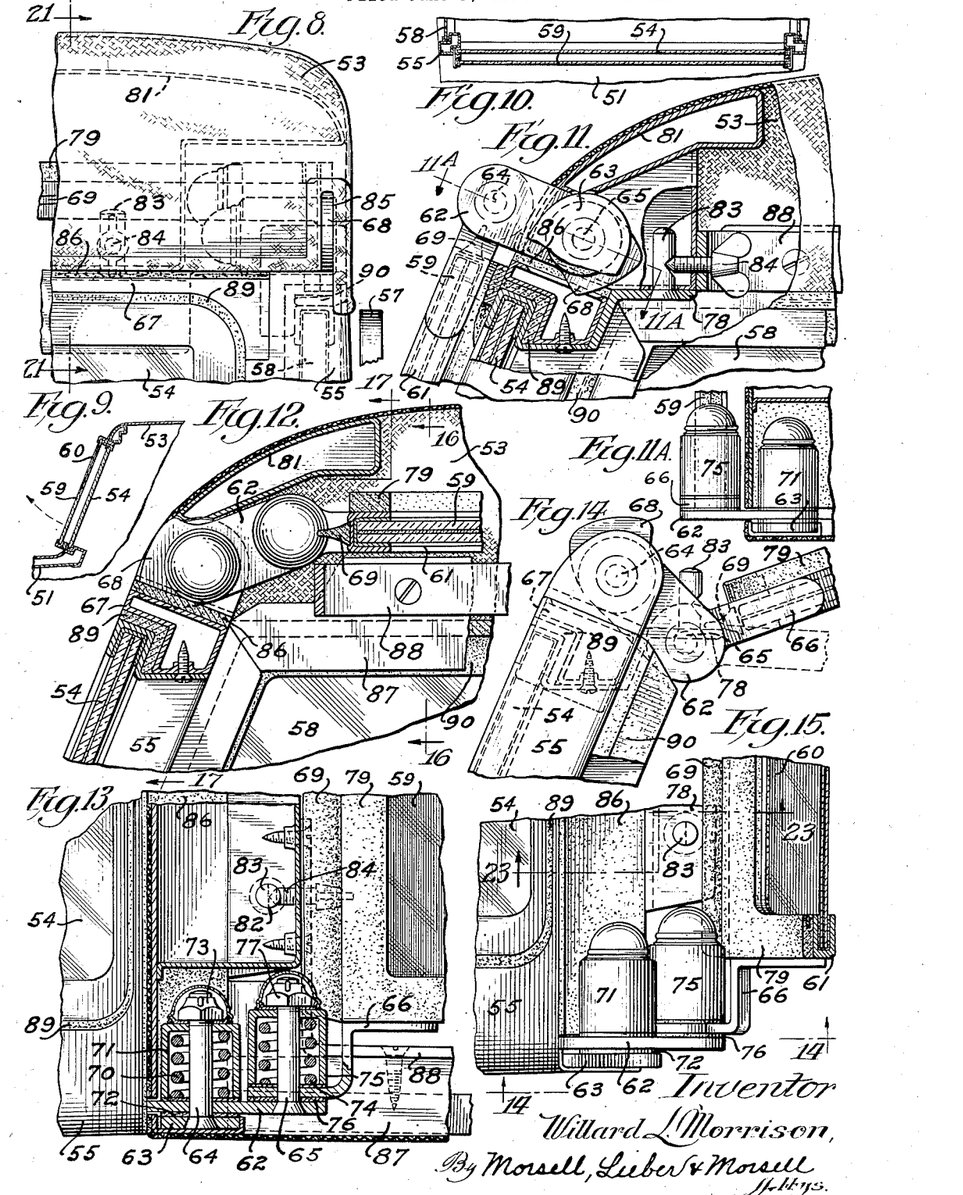
Fig. 8 is an enlarged, fragmentary front view looking toward the secondary windshield, the view being taken along the line 8—8 of Fig. 1.
Fig. 9 is a vertical, sectional view drawn to a reduced scale and taken thru the main and auxiliary windshields along the line 9—9 of Fig. 7.
Fig. 10 is a horizontal, sectional view thru the main and auxiliary windshields, taken along the line 10—10 of Fig. 7.
Fig. 11 is an enlarged, fragmentary, part-sectional view thru the upper portion of the windshield structure and of the auxiliary windshield mounting.
Fig. 11A is a similarly enlarged top view of the auxiliary windshield supporting structure, looking toward the line 11A—11A of Fig. 11.
Fig. 12 is a view similar to that of Fig. 11, showing the secondary windshield swung to a position beneath the top enclosure as when not in use, and showing a section thru the structure taken along the line 12—12 of Fig. 4.
Fig. 13 is an enlarged, fragmentary, sectional view thru the pivotal mounting for the auxiliary shield and thru the adjoining structure.
Fig. 14 is a similarly enlarged, side elevation of the auxiliary shield mounting, showing the vehicle top enclosure removed and the auxiliary shield performing its function as a deflector, the view being taken along the line 14—14 of Fig. 15.
Fig. 15 is a fragmentary, top view of the structure shown in Fig. 14, showing the auxiliary shield functioning as a deflector.
Figures 16, 17:
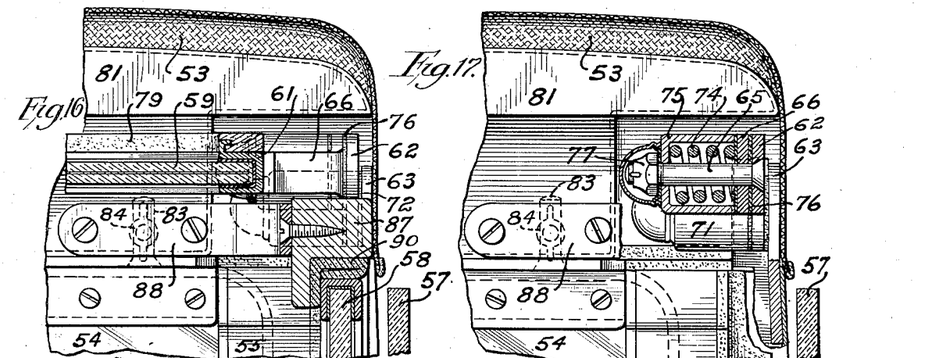
Fig. 16 is a similarly enlarged, fragmentary section thru the device, taken along the line 16—16 of Figs. 4 and 12.
Fig. 17 is a similarly enlarged, fragmentary, sectional view taken along the line 17—17 of Figs. 4 and 12.

As shown in Figs. 8 to 22 inclusive, the top enclosure 53 has a specially constructed front end comprising a hollow metal nose piece 81 having openings 82 therein adapted to receive locking pins 83 projecting upwardly from the sealing flange 78, this flange being adapted to coact with the under-side of the nose piece 81 when the top is in use. The nose piece 81 carries a set of winged screws 84 which are adapted to engage notches in the pins 83 as shown in Figs. 11 and 21, in order to lock the enclosure 53 in active position. The opposite sides of the front portion of the enclosure 53, are also provided with slots 85 for receiving the enlargements 68 of the links 62, these slots 85 serving to guide the nose piece 81 over the pins 83 and to additionally retain the enclosure in proper position. The extreme forward portion of the nose piece 81 may be formed to rest against a sealing pad 86 carried by the cross-brace 67, and additional supports 87 may also be provided for the side portions of the enclosure 53 as shown in Figs. 16 and 22. The side supports 87 may be attached to the nose piece 81 by means of angle braces 88, and the screws 84 may coact with these braces as well as with the piece 81. In order to further insure tight closure, the front windshield 54 may have its supporting frame provided with a seal 89 as shown in detail in Figs. 18 to 23, and the vertically adjustable side windows 58 may be formed for sealing engagement with seals 90 carried by the posts 55 and side supports 87 as indicated in Figs. 16 and 22. It will therefore be apparent, that when the top enclosure 53 is assembled, the interior of the vehicle is as effectively enclosed as it is in the ordinary permanently enclosed car, by virtue of the provision of effective seals at all joints. The top enclosure may, however, be readily released for removal in the usual manner, by merely releasing the screws 84.

When the embodiment of the invention shown in Figs. 2 to 25 inclusive is being utilized as a sub-top as best shown in Figs. 1, 2, 12, 13, 16 and 24, the nose-piece 81 of the top enclosure 53 is positioned in contact with the sealing strip 86 and is locked to the flange 78 by means of the pins 83 and screws 84. With the top enclosure thus positioned, the slots 85 at the opposite ends of the nose-piece 81, engage the projections 68 of the links 62, and force these projections against the sealing strip 86 as shown in Fig. 12, to thereby swing the links 62 into intimate contact with the bottom of the nose piece 81 and thus maintain the auxiliary shield 59 elevated within the enclosure 53 and above the tops of the side windows 58 carried by the doors 56. The inactive auxiliary shield 59 is then disposed horizontal and projects rearwardly beneath the top enclosure 53 and over the heads of the occupants of the driver's seat, being entirely out of the way and avoiding interference and obstruction.

When the top enclosure 53 is removed or lowered as shown in Figs. 3, 4, 14 and 15, the projections 68 of the links 62 are released as illustrated in Fig. 21, and these links may subsequently be swung downwardly so as to permit the sealing lip 69 to engage the flange 78 as in Fig. 23. The springs 70, 74 and the friction pads 72, 76 function to hold the links in various positions of adjustment, and to also hold the shield 59 in different positions of angular adjustment relative to its pivots 65, so that the auxiliary deflector shield 59 may be swung to any desired position as shown in Fig. 3 without opening a gap between the seal strip 69 and flange 78. The auxiliary shield 59 will then cooperate with the fixed main windshield 54 and with the side wings 57 and windows 58, to control the draft at the open driver's seat, and the down draft may be readily regulated by merely adjusting the top shield 59 independently of the settings or adjustments of the other shields.

When utilizing this embodiment of the invention as a clear vision appliance or storm shield for the main windshield 54, in the manner shown in Figs. 6, 7, 9, 10, 11, 18, 19 and 25, the auxiliary shield 59 is swung outwardly from beneath the top enclosure 53 so that the links 62 extend forwardly through the slots 85. After the links 62 have been properly positioned and the top enclosure has been either removed or attached to the pins 83 by means of the screws 84 as previously described, the shield 59 may be swung downwardly so as to bring the sealing pad 79 thereof into intimate contact with the front face of the frame of the main windshield 54, whereupon the clamps 80 become effective to hold the auxiliary shield 59 in place. This disposition of the shield 59 in front of the windshield 54, causes air to be confined in the space between the two shields to thereby prevent moisture deposits upon the outer surface of the shield 59. The tinted portion 60 of the auxiliary shield 59 also cooperates with the air space between the two shields, to maintain clear vision and to eliminate objectionable glare, so that the disposition of the auxiliary shield 59 in front of the main windshield will aid in maintaining clear vision for the occupants of the car at all times.

Figures 27, 27A, 28, 29, 30, 31, 37A:
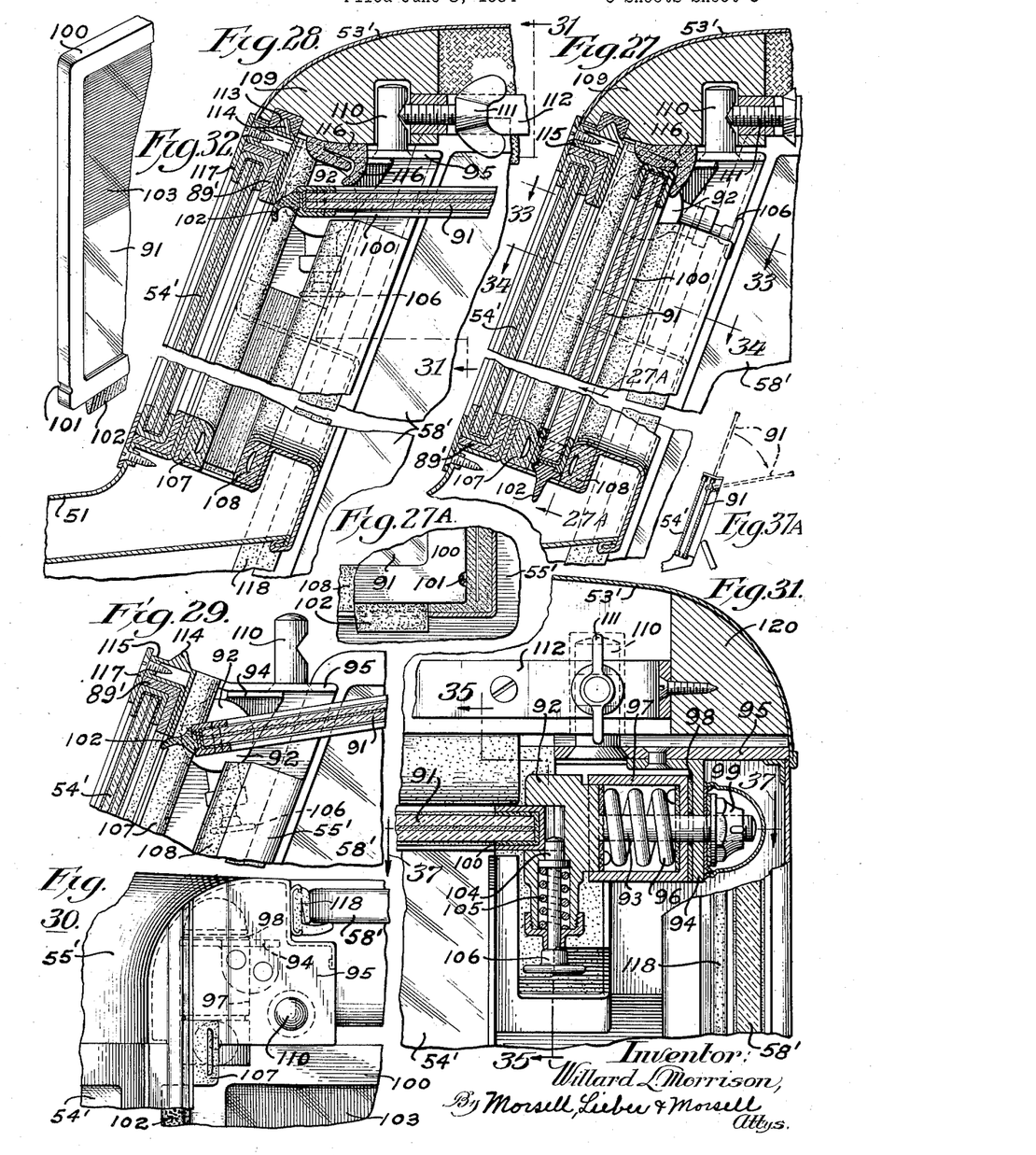
Fig. 27 is a transverse section thru the assemblage of Fig. 26, taken along the line 27—27.
Fig. 27A is an enlarged, fragmentary, sectional view thru one corner of the assemblage of Figs. 26 and 27, the section being taken along the line 27A—27A of Fig. 27.
Fig. 28 is a view similar to that of Fig. 27, but showing the auxiliary windshield removed from active position in front of the main windshield.
Fig. 29 is a fragmentary view similar to that of Fig. 28, but with the vehicle top enclosure removed from the windshield structure.
Fig. 30 is a plan view of the fragmentary structure shown in Fig. 29.
Fig. 31 is an enlarged, sectional view, taken along the line 31—31 of Fig. 28, with some of the parts broken away for the sake of clearness.
Fig. 37A is a diagrammatic, sectional view of the modified windshield structure, showing the relative positions of the windshields and of the steering wheel, and also showing the direction of travel of the auxiliary windshield during removal thereof from operative position.

In the modified embodiment of the invention shown in Figs. 26 to 37A inclusive, an auxiliary shield 91 is pivotally suspended in a modified manner at the upper end of a main windshield, in such manner that the shield 91 may be used interchangeably either as a sub-top when in inactive position, or as a clear vision appliance for the main windshield 54', without necessitating complete removal of the top enclosure 53'. Upon removal of the enclosure 53', this modified shield 91 may also be utilized as a down draft regulator cooperating with the main windshield 54'. The modified shield structure is best shown in Figs. 28 and 31 when used as a sub-top; in Figs. 26, 27, 33 and 34 when used as a storm shield; and in Figs. 29, 30 and 36 when employed as a down draft regulator.

By referring especially to Figs. 26 to 37A inclusive, it will be noted that the pivotal mounting for the auxiliary shield 91 comprises a pair of coaxial pivot members 92 carried by end pivots 93 which are rotatably supported in brackets 94 secured to horizontal plates 95 rigidly attached to the upper ends of the side posts 55'. The pivots 93 are embraced by compression springs 96 disposed within and coacting with housings 97 which in turn coact with friction pads 98 disposed in contact with the adjacent brackets 94, and the tension of these springs 96 may be varied in order to vary the friction, by means of nuts 99 coacting with the pivots 93. The auxiliary shield 91 is provided with a frame 100 the side portions of which are disposed in end grooves formed in the pivot members 92 and are provided with notches 101 as shown in Fig. 32. The transverse portion of the frame 100 nearest the notches 101, is provided with a flexible sealing lip 102, and the portion of the shield 91 remote from the lip 102 may be provided with a glare eliminating area 103. The sides of the frame 100 are slidable in the end grooves of the members 92, and these members carry locking pins 104 which are cooperable with the notches 101 to lock the shield 91 against displacement relative to the pivot members 92 as shown in Fig. 31. The pins 104 are urged into locking position by springs 105 and may be released or retracted by means of gripping knobs 106. The locking pins 104 are effective when the shield 91 is being utilized as a down draft regulator as shown in Figs. 29 and 30, and in dotted lines in Fig. 37A; and when these pins 104 are released, the pivot members 92 and the shield 91 may be swung to the dot-and-dash line position of Fig. 37A, and the shield may thereafter be slid downwardly to position the same parallel to and directly in back of the main windshield 54'. When thus disposed, the auxiliary shield 91 functions as a storm shield and glare eliminator, and the sides of the frame 100 are snugly confined between sealing strips 107, 108 as shown in Fig. 27 to provide a confined air space between the two shields.

The top enclosure 53' of this modification is provided with a solid nose piece 109 extending across the front and adapted to rest directly upon the horizontal side plates 95. As shown in Figs. 27, 28 and 30, these plates 95 are provided with rigid pins 110 which are adapted to enter recesses in the nose piece 109, and winged screws 111 carried by braces 112 secured to the nose piece, are adapted to engage detents in the pins 110 in order to lock the top enclosure 53' in elevated position. The nose piece 109 also has a front groove 113 adapted to receive a sealing projection 114 carried by a cross piece 115 rigidly connecting the upper ends of the posts 55'; and is moreover provided with a lower flexible sealing strip 116 which is formed to cooperate with the shield 91 in various positions of adjustment thereof as shown in Figs. 27 and 28. The flexible lip 102 of the auxiliary shield 91 is adapted to coact with the inner surface of the cross piece 115 when this shield is being utilized as a deflector, as indicated in Figs. 28 and 29, and the frame of the main windshield 54' is confined within a sealing strip 89', by a retainer plate 117. When the top enclosure 53' is in use, and the shield 91 is functioning as a storm shield cooperating with the main windshield 54', the joints between the several shields and their supports, as well as those between the top enclosure and the cross piece 115, are effectively sealed against passage of air therethrough.

Figures 24, 25, 26:
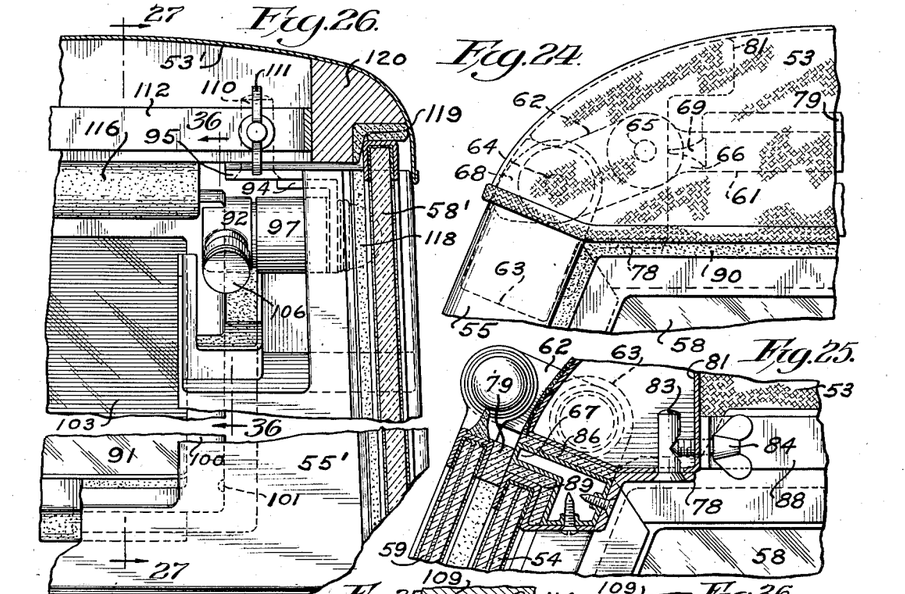
Fig. 24 is an enlarged, side elevation of the upper, forward corner of the vehicle enclosure, showing the auxiliary shield positioned within and beneath the top enclosure of the car.
Fig. 25 is an enlarged, fragmentary, sectional view, taken thru the upper, forward corner of the vehicle enclosure and showing the disposition of the parts when the auxiliary windshield is associated with the front of the main windshield.
Fig. 26 is an enlarged, fragmentary, part-sectional view similar to that of Fig. 16, but showing a modified construction with the auxiliary windshield functioning as a storm shield and having the intermediate portions of the shields broken away.

The side windows 58' of this modified structure may be similar to those previously described, and may also cooperate with side wings coacting with the main windshield 54'. These side windows 58' may be formed for sealing coaction at the front and top thereof, with packing strips 118, 119 carried by the posts 55' and by the side portions of the top enclosure 53', respectively. The braces 112 may also be formed for coaction with side beams 120 of the top enclosure 53' as shown in Fig. 26, and the strips 119 may be attached directly to these beams 120.

Figures 33, 34, 35, 36, 37, 49, 50:
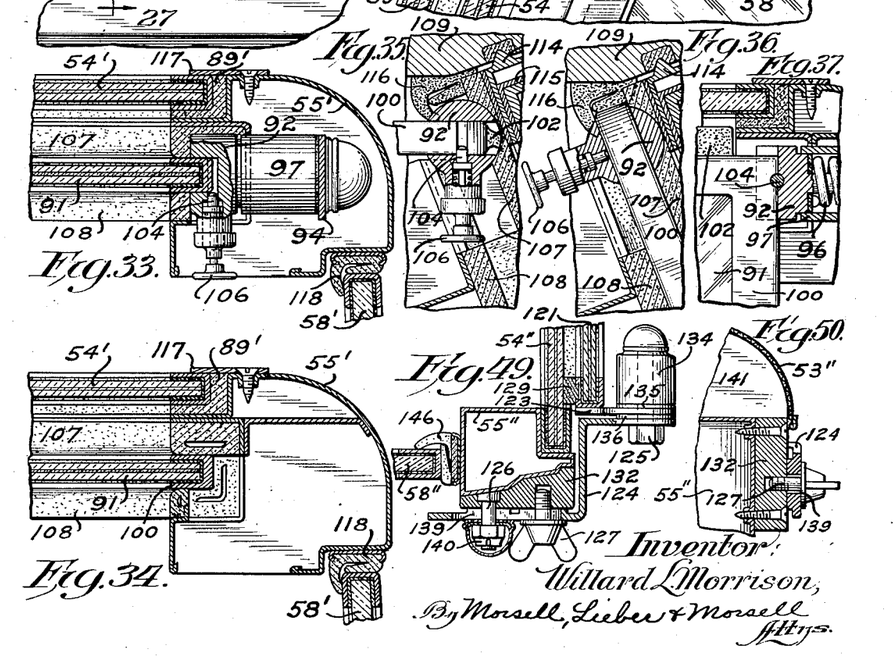
Fig. 33 is a fragmentary section, taken on the line 33—33 of Fig. 27.
Fig. 34 is a similar fragmentary section, taken along the line 34—34 of Fig. 27.
Fig. 35 is a fragmentary, sectional view, taken along the line 35—35 of Fig. 31.
Fig. 36 is a similar fragmentary, sectional view, taken along the line 36—36 of Fig. 26.
Fig. 37 is a fragmentary, sectional view, taken along the line 37—37 of Fig. 31.
Fig. 49 is a section thru the assemblage, taken along the line 49—49 of Fig. 43.
Fig. 50 is a fragmentary, sectional view thru the assemblage, taken along the line 50—50 of Fig. 43.

When the embodiment of the invention shown in Figs. 26 to 37A inclusive is being utilized as a sub-top as best shown in Figs. 28 and 35, the nose piece 109 has its groove 113 in engagement with the projection 114 of the cross piece 115 and is locked in such position by means of the pins 110 and screws 111. With the top enclosure 53' thus positioned, the pivot members 92 are free to rotate, and the auxiliary shield 91 will then preferably be disposed in horizontal position directly beneath the top enclosure so as not to interfere with the free use of the side doors and to avoid obstruction to individuals entering or leaving the vehicle.

The top enclosure 53' may be conveniently released and removed by merely withdrawing the screws 111 from the posts 110, so as to permit utilization of the shield 91, either as a deflector shield cooperable with the main windshield 54', or as a storm shield disposable in back of the main windshield. Fig. 29 discloses the shield 91 being utilized as a down draft deflector, with the top enclosure 53' completely removed. The shield 91 may be swung to any desired position of adjustment while the lip 102 thereof cooperates with the rear surface of the cross piece 115 in a manner to prevent the formation of a gap between the front edge of the shield 91 and the main windshield. In order to utilize the auxiliary shield 91 as a storm shield or as a clear vision appliance, the shield 91 may be swung to a substantially vertical position as shown in Figs. 37A and thereafter slid downwardly within the members 92 and between the packings 107, 108 to the position shown in Fig. 27. Such adjustment of the shield 91 may be effected only after the locking pins 104 have been released, and when the adjustment has been made, an airtight chamber is provided between the main windshield 54' and the auxiliary shield 91. It will be apparent from the foregoing description that this modified device is adapted to be interchangeably utilized as a sub-top, as a down draft regulator, or as a storm shield, and when it is utilized for the latter purpose, the tinted area 103 serves to eliminate undesirable glare at the driver's seat.

In the further modified embodiment of the invention shown in Figs. 38 to 50 inclusive, the construction of the auxiliary shield is quite similar to that of Figs. 2 to 25 inclusive, and the top enclosure is similar in structure to that of Figs. 26 to 37A inclusive, but the means for supporting the auxiliary shield is different from that of both prior disclosures. The auxiliary shield 121 has a frame 122 provided with suspension brackets 123; and these brackets 123 are swingably attached to links 124 by means of pivots 125, while the links 124 are both swingably and slidably associated with pivots 126 and clamping studs 127 carried by side plates 128 secured to the upper ends of the side posts 55''. The frame 122 of the shield 121 is provided with a sealing pad 129 adapted to snugly engage the outer or front face of the frame of the main windshield 54'' when the device is being utilized as a storm shield, and the shield 121 may also be provided with a tinted glare eliminating area 130 disposed near the brackets 123. The transverse portion of the frame 122 nearest the brackets 123 is provided with a flexible sealing lip 131 which is cooperable with the rear surface of a cross-piece 132 connecting the tops of the posts 55'', when the device is being employed as a down draft regulator or as a sub-top.

Figures 38, 39, 40, 41, 42:
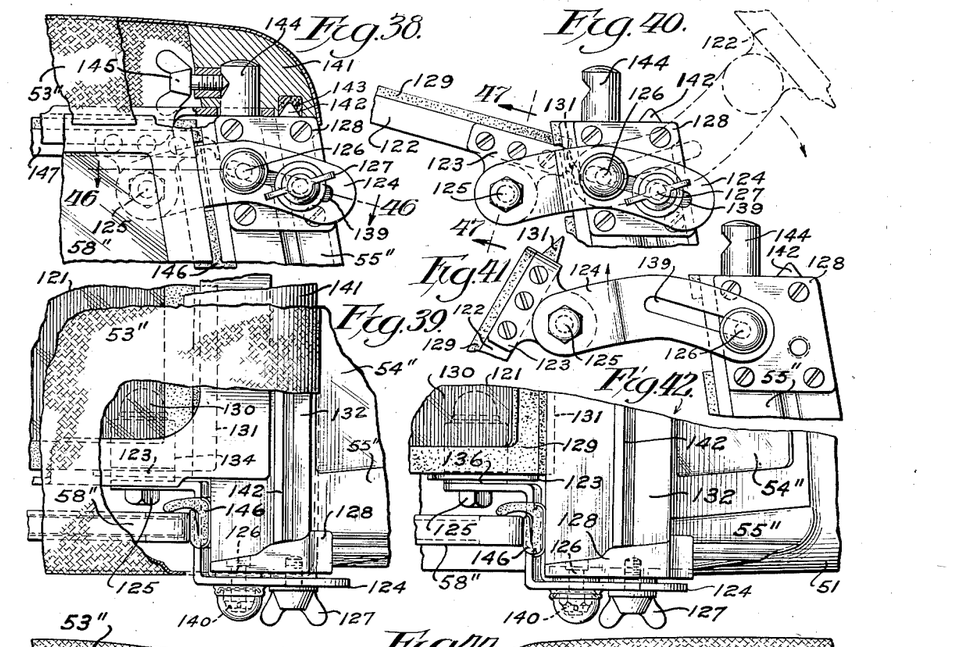
Figures 43, 44, 45, 46, 47, 48:
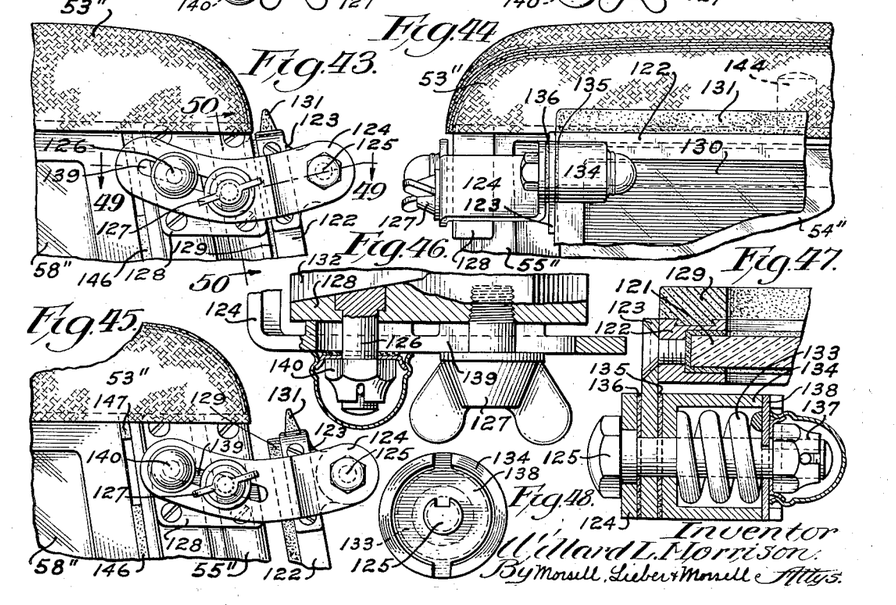
Fig. 43 is a side elevation of the improved auxiliary windshield assemblage, similar to that of Fig. 38, but showing the auxiliary shield cooperating with the front of the main windshield.
Fig. 44 is a front elevation of the structure disclosed in Fig. 43.
Fig. 45 is a view similar to that of Fig. 43, but showing the auxiliary windshield after it has been positioned in front of the main windshield, but prior to adjustment thereof into clamped relationship with the main windshield.
Fig. 46 is an enlarged, fragmentary, sectional view, taken along the line 46—46 of Fig. 38.
Fig. 47 is a similarly enlarged, fragmentary, sectional view, taken on the line 47—47 of Fig. 40, and showing the friction means associated with the auxiliary windshield.
Fig. 48 is a sectional view thru the friction elements of Fig. 47, with parts removed in order to more clearly show the details.

The pivots 125 are embraced by compression springs 133 disposed within and coacting with housings 134 which, in turn, coact with the brackets 123 thru friction pads 135, and similar friction pads 136 are interposed between the outer faces of the brackets 123 and the adjacent surfaces of the links 124, as clearly shown in Fig. 47. The tension of the springs 133 is adjustable with the aid of nuts 137 coacting with the pivots 125 and with reaction plates 138 coacting directly with the spring ends. The pivots 126 and studs 127 pass thru slots 139 formed in the links 124, as clearly shown in Figs. 38, 43, and 46, and the links are bent as illustrated in Figs. 39, 42, and 49. Clamping nuts 140 coact with the pivots 126 which are permanently attached to the plates 128, and the studs 127 are detachably secured to these side plates.

The top enclosure 53″ of this second modification is similar to that of the first modification, being provided with a solid nose piece 141 extending across the front and adapted to rest directly upon the cross-piece 132, as shown in Figs. 38 and 39. The cross-piece 132 is provided with a projection 142 adapted to enter a recess 143 in the nose piece 141, and also has integral pins 144 adapted to enter local recesses in the nose piece 141 which carries winged screws 145 cooperable with the pins 144 to lock the top enclosure 53″ in assembled position. The side windows 58″ of this modification are cooperable with sealing strips 146 secured to the side posts 55″ and may also cooperate with similar sealing strips 147 carried by the side portions of the top enclosure 53″.

When the modified device of Figs. 38 to 50 inclusive, is being utilized as a sub-top as shown in Figs. 38 and 39, the nose piece 141 of the top enclosure 53″ has its recess 143 engaging the sealing projection 142 of the cross-piece 132, and the top enclosure is locked in elevated position by the screws 145 coacting with the pins 144. The pivots 126 and studs 127 coact with the slots 139 of the links 124 in the manner shown in Fig. 38, and the auxiliary shield 121 may then be disposed in horizontal position directly beneath the top enclosure 53″. The side windows 58″ are adapted to cooperate with the sealing strips 146, 147 to prevent drafts at the opposite sides of the enclosure, and the seal afforded by the projection 142 and recess 143 likewise prevents draft at the front of the enclosure. With the shield 121 thus disposed, it is entirely out of the way, tho readily accessible for other uses.

Upon removal of the top enclosure 53″ as shown in Fig. 40, the auxiliary shield 121 may be utilized as a down draft regulator by adjustment thereof about its pivots 125. During such adjustment of the shield 121, the sealing lip 131 remains in contact with the rear surface of the cross-piece 132 so as to eliminate formation of a gap, and the friction pads 135, 136 function to hold the shield in any desired position of adjustment.

When it is desired to utilize the modified auxiliary shield 121 as a glare or storm shield, the clamping studs 127 must be removed and the nuts 140 coacting with the fixed pivots 126 should be released sufficiently to permit the links 124 to be shifted as shown in Fig. 41. The shield 121 and links 124 may subsequently be swung as shown in dot-and-dash lines in Fig. 40, and the shield 121 may thereafter be rotated relative to the links 124 to position the shield 121 in front of the main windshield 54″ as clearly shown in Fig. 45. With the auxiliary shield thus located, the studs 127 may again be applied to the side plates 128 and the links 124 may be shifted to the position shown in Figs. 43 and 44 so as to bring the pad 129 into sealing engagement with the front face of the windshield frame. The tinted area 130 of the auxiliary shield 121 will then function as a glare eliminator, and the shield 121 will be separated from the windshield 54″ by a confined air space to thereby eliminate deposition of vision-obstructing coatings of moisture or the like on the coacting shields.

From the foregoing description it will be apparent that each of the three embodiments of the invention provides an auxiliary shield which is adapted to be interchangeably utilized, either as a sub-top, as a down draft regulator, or as a clear-vision and storm shield. The auxiliary shield is, in each instance, associated with the main windshield in such a manner that it may be disposed either at the upper rear portion of the main windshield or directly adjacent thereto, so as to provide an intervening confined air space. In two of the embodiments, the auxiliary shield is adapted to be disposed in front of the main windshield when being utilized as a storm shield, while the other embodiment provides for disposition of the auxiliary shield in back of the main windshield. The pivotal mountings for the auxiliary shields are such that they will maintain this shield in any desired position of adjustment when the shield is being utilized as a down draft regulator, and in each case the adjacent edges of the auxiliary shield and of the main windshield are packed against undesirable leakage of air between these shields. The suspension of the auxiliary shield by links is desirable when this shield is disposable in front of the main windshield, and the mountings for the improved auxiliary shield may be readily applied to standard convertible cars. The use of a tinted area in the auxiliary shield avoids necessity of providing other glare eliminators, and the improved device may be attractively finished so as to provide an added attraction for the vehicle. The improved auxiliary shield is at all times readily accessible for manipulation and conversion thereof from one use to another and is obviously cooperable with the side windows and wings of the car so as to provide for maximum comfort at the driver's seat when the top enclosure has been removed.

It should be understood that it is not desired to limit the invention to the exact details of construction and to the precise mode of operating the devices herein shown and described, for various modifications within the scope of the claims may occur to persons skilled in the art.

It is claimed and desired to secure by Letters Patent:

1. In combination, a windshield, a support for said windshield, links pivotally attached to said support near the top of said windshield, and an auxiliary shield pivotally attached to the swinging ends of said links, said links being formed to permit disposition of said auxiliary shield on either side of the plane of said windshield.

2. In combination, a windshield, a support for said windshield, links pivotally attached to said support near the top of said windshield, and an auxiliary shield pivotally attached to the swinging ends of said links, said links being formed to permit disposition of said auxiliary shield either in front of and parallel to said windshield or projecting rearwardly from the upper edge thereof.

3. In combination, a windshield, a support for said windshield, movable means pivotally attached to said support near the top of said windshield, and an auxiliary shield pivotally attached to said movable means remote from the pivotal attachment thereof to said support, said movable means being formed to permit disposition of said auxiliary shield on opposite sides of the plane of said windshield.

4. In combination, a windshield, a support for said windshield, movable means pivotally attached to said support near the top of said windshield, and an auxiliary shield pivotally attached to said movable means remote from the pivotal attachment thereof to said support, said movable means being formed to permit disposition of said auxiliary shield on one side of and parallel to said windshield and on the opposite side of and at an angle to said windshield.

5. In combination, a windshield, a support for said windshield, movable means pivotally attached to said support near the top of said windshield, and an auxiliary shield pivotally attached to said movable means remote from the pivotal attachment thereof to said support, said movable means being formed to permit disposition of said auxiliary shield either in front of and substantially parallel to said windshield or projecting rearwardly at an angle to and away from the upper edge of said windshield.

6. In combination, a windshield having a support, movable means pivotally attached to an upper portion of said support, and an auxiliary shield pivotally attached to a swinging portion of said movable means and having a glare eliminating area near its pivotal mounting, said movable means being operable to position said auxiliary shield with its glare eliminating area either parallel to and on one side of said windshield or projecting away from the opposite side of the latter.

7. In combination, a windshield having a marginal frame and a support therefor, links pivotally attached to said support near the upper end of said frame, and an auxiliary shield having a frame pivotally attached to swinging portions of said links, said links being operable to position said auxiliary shield either in front of and with its frame in substantial contact with said windshield frame or projecting rearwardly from the upper edge of the latter.

8. In combination, a windshield having a marginal frame and a support therefor, links pivotally attached to said support near the upper end of said frame, an auxiliary shield having a frame pivotally attached to swinging portions of said links, said links being operable to position said auxiliary shield either in front of and with its frame in substantial contact with said windshield frame or projecting rearwardly from the upper edge of the latter, and sealing means coacting with both of said frames when said auxiliary shield is disposed in front of said windshield.

9. In combination, a windshield, a support for said windshield, movable means pivotally attached to said support near the top of said windshield, an auxiliary shield pivotally attached to said movable means remote from the pivotal attachment thereof to said support, and side wings pivotally supported at the opposite ends of said windshield, said movable means being formed to permit disposition of said auxiliary shield on one side of and parallel to said windshield and on the opposite side of and at an angle to said windshield between said side wings.

WILLARD L. MORRISON.